(12) United States Patent
Pasic

(10) Patent No.: US 8,534,657 B2
(45) Date of Patent: Sep. 17, 2013

(54) AUTOMATICALLY RELEASING MACHINE TOOL CLAMP

(76) Inventor: Robert Pasic, Vancouver, WA (US)

( * ) Notice: Subject to any disclaimer, the term of this patent is extended or adjusted under 35 U.S.C. 154(b) by 1171 days.

(21) Appl. No.: 12/387,513

(22) Filed: May 4, 2009

(65) Prior Publication Data

US 2009/0276995 A1 Nov. 12, 2009

Related U.S. Application Data

(60) Provisional application No. 61/126,758, filed on May 6, 2008.

(51) Int. Cl.
*B25B 1/14* (2006.01)
(52) U.S. Cl.
USPC .............. 269/228; 269/289 R; 29/281.1
(58) Field of Classification Search
USPC ............ 29/281.1, 281.3, 281.5; 269/228, 269/201, 32, 33, 24, 27, 289 R, 329
See application file for complete search history.

(56) References Cited

U.S. PATENT DOCUMENTS

| | | | | |
|---|---|---|---|---|
| 2,350,034 A | * | 5/1944 | Herrington | ................ 269/164 |
| 3,970,296 A | | 7/1976 | Rameson | |
| 5,524,328 A | | 6/1996 | Hardesty | |
| 5,592,793 A | * | 1/1997 | Damratowski et al. | ......... 52/182 |
| 5,647,706 A | | 7/1997 | Lehmler | |
| 5,816,567 A | | 10/1998 | Horn | |
| 6,158,729 A | * | 12/2000 | Tsai | ............... 269/228 |
| 6,409,161 B1 | | 6/2002 | Wolff et al. | |
| 6,637,737 B1 | * | 10/2003 | Beecherl et al. | ............... 269/71 |
| 6,817,603 B2 | | 11/2004 | Kofod | |
| 6,991,521 B2 | * | 1/2006 | Hagan et al. | ................... 451/44 |
| 8,132,802 B2 | * | 3/2012 | Kolodge et al. | ............... 269/275 |
| 2002/0020953 A1 | * | 2/2002 | Kofod | ............ 269/228 |
| 2002/0097317 A1 | * | 7/2002 | Wood et al. | ................... 347/218 |
| 2007/0267799 A1 | * | 11/2007 | Dykstra | ....................... 269/228 |
| 2009/0276995 A1 | * | 11/2009 | Pasic | ............... 29/559 |

* cited by examiner

*Primary Examiner* — Lee D Wilson
(74) *Attorney, Agent, or Firm* — Robert Anton Pasic

(57) ABSTRACT

An automated clamping system for securing a work piece to the table of a machine tool. The clamping system automatically retracts away from the work piece as the material manipulating device moves into the area of each clamp. This allows manipulation of the work piece without stopping to move the clamp to a new location so that the clamp does not interfere with the metal manipulating device. A typical embodiment is the use of the system on a milling machine. The clamping system could be used with milling machines (both manual and computer controlled), routers, water jet cutters, laser cutters, flame cutters, and many other types of cutting machines.

9 Claims, 9 Drawing Sheets

AUTOMATICALLY RELEASING MACHINE TOOL CLAMP

CROSS REFERENCES

This application claims the priority of Provisional Application USPTO No. 61/126,758 filed on May 6, 2008 under 35 U.S.C. 111b.

STATEMENT REGARDING FEDERAL SPONSORED RESEARCH OR DEVELOPMENT

This application is not the result of a federally sponsored research or development effort.

PARTIES INVOLVED IN JOINT RESEARCH AGREEMENTS

The inventor is not involved in any joint research agreements or obligations to assign the invention described herein.

REFERENCE TO PROGRAM LISTING

A program listing is provided in appendix A for use on a Tri-Research PLC.

FIELD OF THE INVENTION

The invention generally relates to metal manipulating devices used to cut work pieces that are typically held in place by some form of clamping. A typical embodiment would be for use on the table of a milling machine. The invention automatically removes the clamp from the cutting area as the cutting tool moves into the area of each clamp. This eliminates the need to stop the cutting process to move the clamp manually.

BACKGROUND OF INVENTION

This application is to be filed under 35 U.S.C. 111(a) and claims priority under 35 U.S.C. 119(e) to provisional application USPTO No. 61/126,758 filed on May 6, 2008 under 35 U.S.C. 111b.

A new machine tool clamp system is specially adapted to prevent the tool bit from contacting the clamp while allowing the tool access the entirety of all sides and top of the work piece.

Machine tools, including various types of mills and routers, allow operators to manipulate metal and other materials. Most machine tool systems make use of manual clamps to secure a work piece in a fixed position relative to the tool. These clamps are typically secured with bolts that are adjusted manually in order to apply or release a clamping force with respect to the work piece.

In other instances the work piece is held in a vise which grips two opposite sides. This method does not allow the manipulation of the work piece on the two sides.

Another method that is commonly used, is to bolt the work piece to a piece of scrap, this allows the manipulation of all edges, but requires additional "mounting" holes in the work piece. An additionally problem with this approach is that the holes required in the part need to allow for clearance around the bolts. This clearance provides some uncertainty as to the location of "mounting" holes relative to the finished part.

Additionally, most CNC machining centers provide for additional digital outputs which can be controlled by the machining program. Using this method has its own difficulties. First, the CNC programmer must consider the location of each clamp while writing the machining program and the operator doing the setup must properly locate the clamps. Second, the CNC machining center (or milling machine) must provide the digital outputs required for all the clamps. Many CNC machining centers (and milling machines) do not provide enough. Third, the digital outputs must be provided; in the case of manual milling machines such functionality is typically not available.

Yet another problem with existing clamping mechanisms is the need to provide hydraulic clamping systems to provide the required clamping force during some work piece manipulations. Typically, manufacturers have easy cost effective compressed air available. This compressed air is used to blow chips and debris from the manipulating area during clean up or "on machine" inspection. The use of a pneumatically actuated clamp is desirable in situations where the manufacturer doesn't yet have the need for hydraulics.

SUMMARY OF THE INVENTION

The invention provides an automated clamping system; this clamping system provides several advantages over conventional clamping systems. The invention includes a clamp which increases the clamping force as the foot comes to rest on the work piece and increases the travel as the foot retracts from the work piece, provides for common pneumatic (or other, electric, hydraulic) clamping methods, provides for automatic retraction of the clamping foot allowing clearance in the material working area, and provides for a method of clamping work pieces using the device.

One aspect of the design is the ability to retract from the metal working area as the cutting tool moves into the area of the clamp. This retraction allows the metal working device to continue to function without being obstructed by the clamp. Additionally, the design allows for locating debris sensitive components (i.e. air cylinder) out of the metal working area this improves the life of the sensitive component.

The clamping system allows for greater production time as the machine does not need to be stopped while the clamp is repositioned. A typical manual clamp will not retract to clear the cutting tool and so as the cutting tool approaches the operator must stop the cutter to move the clamp.

Another advantage is the ease of clamping work piece to the table during repetitive machining operations where several work pieces are manipulated sequentially. Each finished part is released by the operator pressing each clamp control button on the control panel, then simply placing the next work piece into the clamps and switching the clamp control switch to the clamp position.

The work piece in this design need not be preprocessed to allow for a method of clamping during the machining process. No "mounting" holes are required, no finished sides of the work piece need be existing (as in the case of clamping) and the work piece is not manipulated to allow access to any of the sides for additional work piece operations.

The control system for the clamp provides for the retraction (unclamping) and later extension (re-clamping) of the work piece as the machining tool moves into and away from the clamp area. The advantages of this system include; 1) when used on a programmable material manipulating machine, the program used for manipulation need not consider the location of the clamps; 2) when setting up the clamps accurate location is not required relative to the program of the material manipulating machine (milling machine program); 3) Since the device does not require interfacing with the program used to manipulate the work piece the, the device can be used on a manual milling or routing machine.

The control system "tracks" the table position by encoders located on the lead screw of the machining device. Note, the use of encoders and lead screws is dictated by the particular machine on which the clamp is used. Other devices such as linear encoders, rotary encoders with an attached drive system which provides rotation to the encoder as a function of table position will suffice. Additionally, any positioning system can be used these include but are not limited to resolvers, inductosyns, potentiometers (both linear and rotary) and Linear Voltage Transducers (LVDT).

The clamping actuation is provided through a "push/pull" cable. This feature provides several advantages. First, the work area of the milling machine is reduced as large clamping generating devices (pneumatic, electric or hydraulic cylinders) are not located in the area. Instead the flexible push/pull cable provides for the mounting of these actuators to be located remotely. Secondly, actuators of this type may be prone to damage created by debris from cutting processes or cutting fluids. By locating these devices remotely they can be located such that this problem is eliminated.

The method of use for the system can now be explained. Using a number of clamps typically four or more the operator locates the work piece and the clamps such that the finished part will be clamped by each of the clamps when the process is complete. Stated another way the clamps are to clamp on the area of the work piece in which the finished part will reside. Using a 3 way toggle button on the Control Panel (discussed more in the detailed description) established for each clamp the operator clamps the work piece. Now the operator moves the cutting tool into a position directly above each clamp. When the cutting tool is located above the clamp the operator presses the corresponding clamp button (the "SET" position of the toggle switch). Since the program for controlling the clamps is running when powered up the clamp retracts. This provides confirmation to the operator that the particular clamp position has been "taught" to the controller. This procedure is repeated for each clamp. The work piece may now be machined, as the cutting tool moves into each clamp area the corresponding clamp will retract providing clearance around the work piece.

Although the use of four clamps is recommended for typical use the system is not limited by this particular requirement. The system can be used in addition to manual clamps. This would allow the machining of only the side or sides held by the automated clamp and may be advantageous when used with tooling for locating the work piece. Additionally, the number of clamps is not restricted to less than four. In cases where the work piece is very large additional clamps can be added without violating the invention.

DETAILED DESCRIPTION

This description will illustrate the invention as used on a conventional milling machine. As implied above the invention can be used on several work piece manipulating devices these include numerically controlled milling machines, numerically controlled machining centers, routers, water jet and laser routers.

Figure 1:
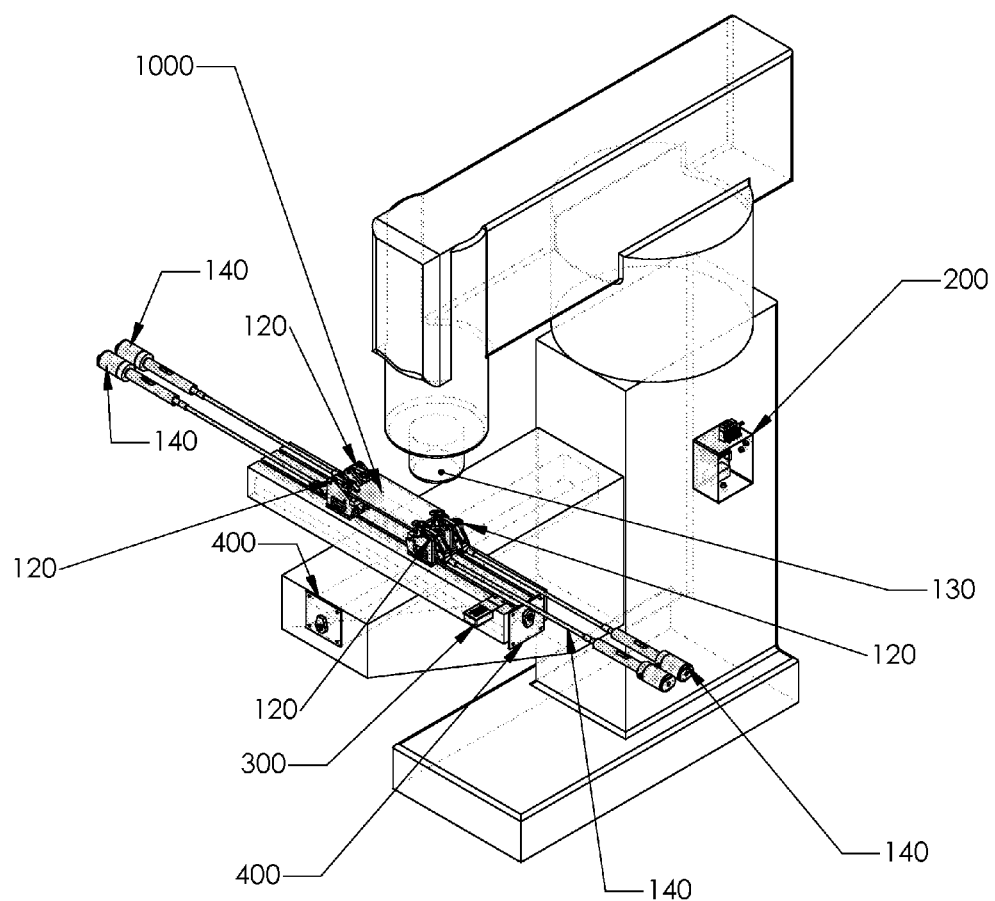
FIG. 1—an isometric view of the invention installed on a milling machine

The system is shown in FIG. 1 and includes the controller item 200, encoder assembly items 400, multiple clamp acutators 140, clamps 120 and a control panel item 300. In this drawing a typical milling machine item 130 along with a work piece item 120 are also shown. Though an implementation using a milling machine is shown the device could be easily modified for use on a router or other machine which mounts the cutting tool on actuators and the work piece is stationary. Additionally, the method of using the system is also provided.

Figure 3:
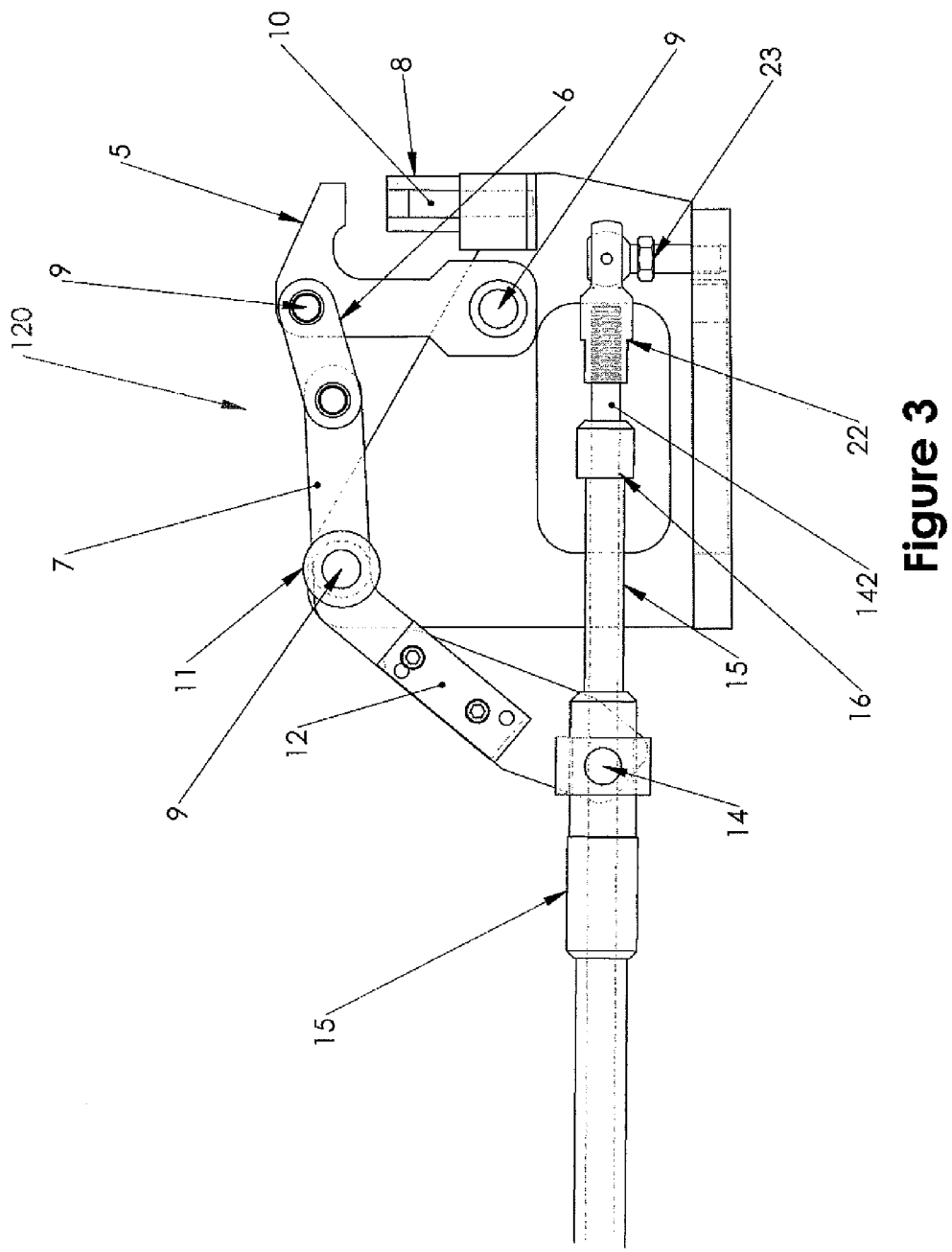
FIG. 3—An elevation view of the clamp mechanism

A side view of the clamp 120 is shown in FIG. 3. This device consists of the linkages 5, 6 and 7, the base 24, the push/pull cable 15, the push/pull cable jacket mount 14, the spherical pivot assembly 22, work rest 8, and linkage pins 9. This drawing shows the clamp in the clamped position, in this position the push/pull cable is pulling on the spherical pivot assembly 22 toward the push/pull cable jacket mount 14. This pulling causes linkage 7 to rotate CCW and lift the end of linkage 6, linkage 6 pivots into a position that causes linkage 5 to pivot CW into the work piece (not shown) that rests on the work rest 8.

Figure 2:
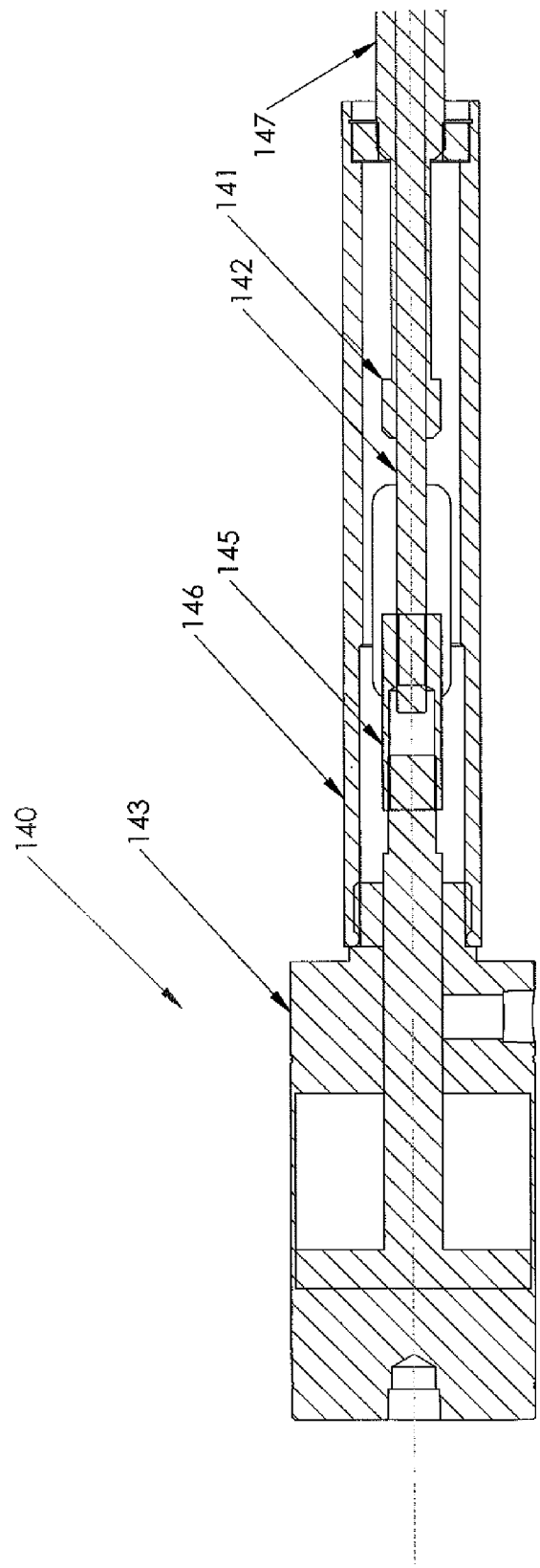
FIG. 2—A cross sectional view of the actuator assembly

The push/pull cable 15 of FIG. 3 is actuated by a cylinder. FIG. 2 shows a cross sectional view of the actuator assembly 140. The push/pull cable consists of a jacket 501 and an internal cable 2. The cable inside the jacket 2 is free to slide. With a cable 2 that is longer than the jacket 501 (i.e. the ends of the cable protrude from the ends of the jacket), the cable 2 can be pulled and pushed from one end causing the other end to slide out and into the jacket 501. This component is purchased and is readily available. Its advantages include removing the primary actuator 3 (i.e. air cylinder) from the area of the machining process, reducing the occupied space of the clamp and eliminating a need for mounting the primary actuator so that the actuating force can be transmitted to the mounting. The clamping force is transmitted through the jacket.

The actuator assembly 140 consists of a cylinder 143, a cylinder mount tube 146, a joint 145 and a jacket mount 147. Additionally, the other end of the push/pull cable is also included. The joint 145 provides for mounting the cylinder rod to the end of the internal cable 142 of the push/pull cable assembly. This drawing shows the cylinder 143 in the retract position this causes the internal cable of the push/pull assembly to extend from the external jacket 141. The opposite end of the internal cable retracts and causes the clamp 120 to grip the work piece 1000. To release the work piece 1000 (or move away from the cutting tool) the cylinder 143 extended causing the internal cable of the actuator assembly to extend. This action causes the clamp 120 to open clearing the cutting tool.

The clamp 120 includes a replaceable work piece rest 8. This rest 8 is used for positioning the top surface of the work piece 1000 at the correct position. The rest 8 is attached by screwing the rest 8 onto a screw 10 as shown in FIG. 3. Also understand that the rest 8 can be adjusted in height by positioning the rest 8 at any position along the screw 10.

Figure 8:
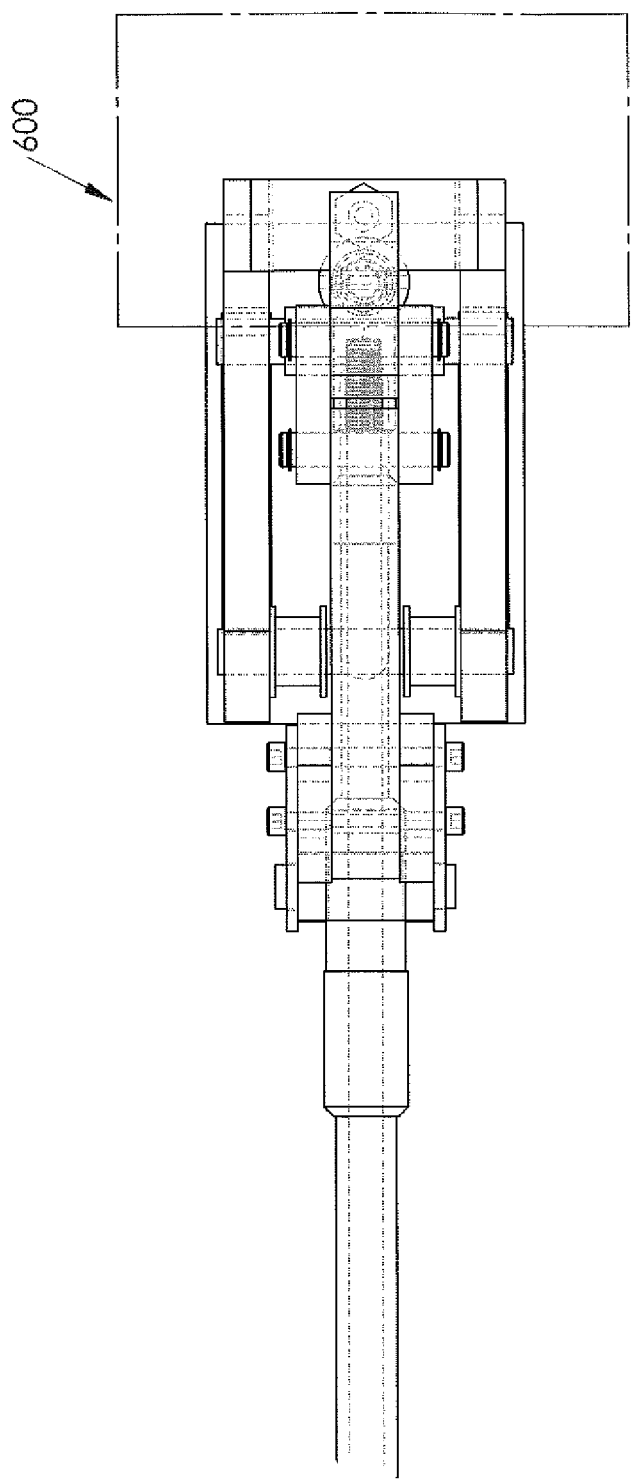
Figure 9:
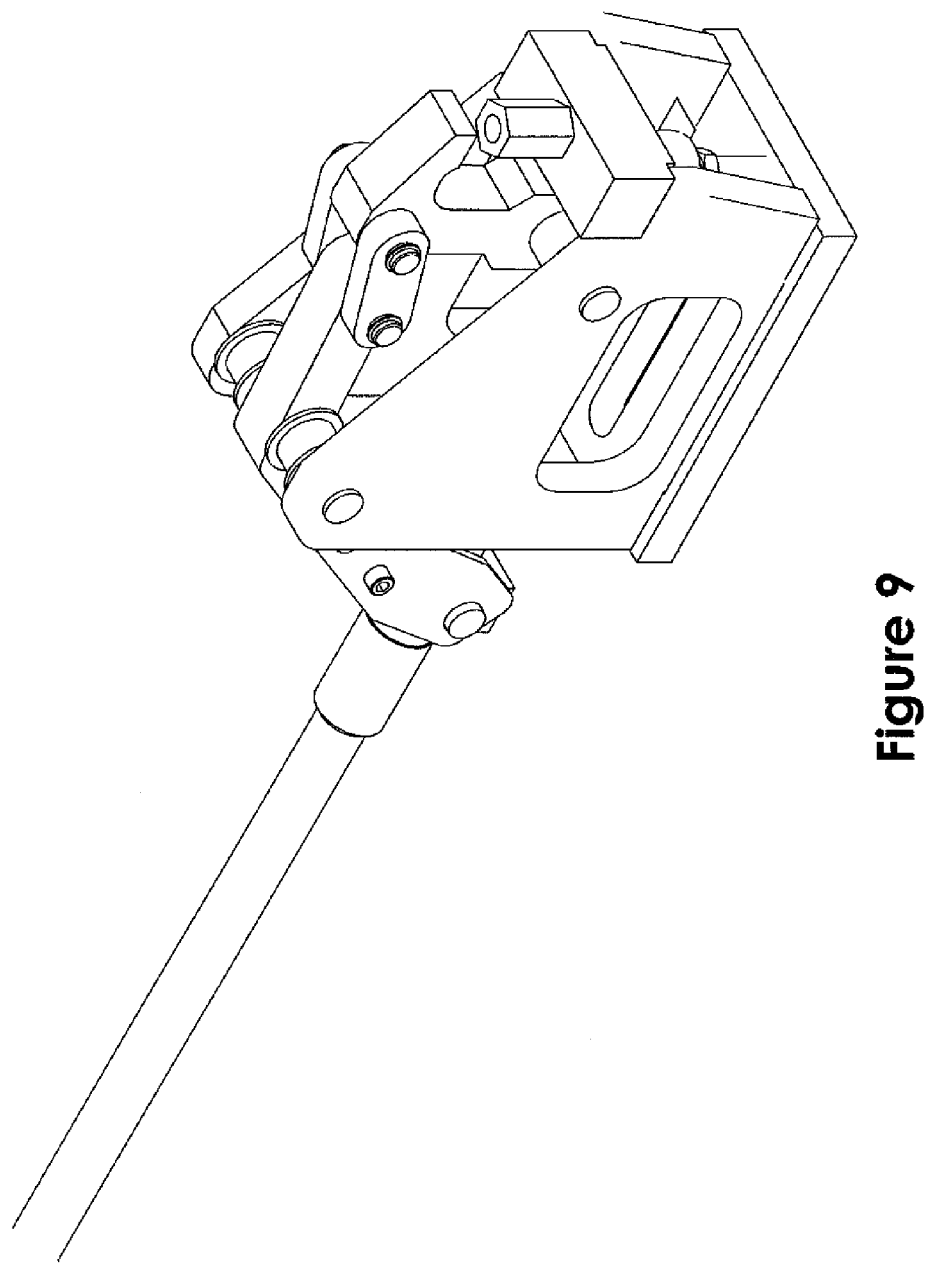

The control system 200 tracks the position of the clamps 120 and as each clamp 120 moves into the area of the cutting tool 130 the controller turns an output on causing the clamp 120 to retract. FIG. 8 shows a typical "clamp retract" area 600. This rectangular area is established around each clamp during the set up process.

The control system 200, comprising an operator control panel 300, two assembly encoders 400 (or position sensing devices), a programmable logic controller 210 (such as the Triangle Research International Inc. T100 MD+), a power supply 202 and a plurality of valves 201A.

Figure 5:
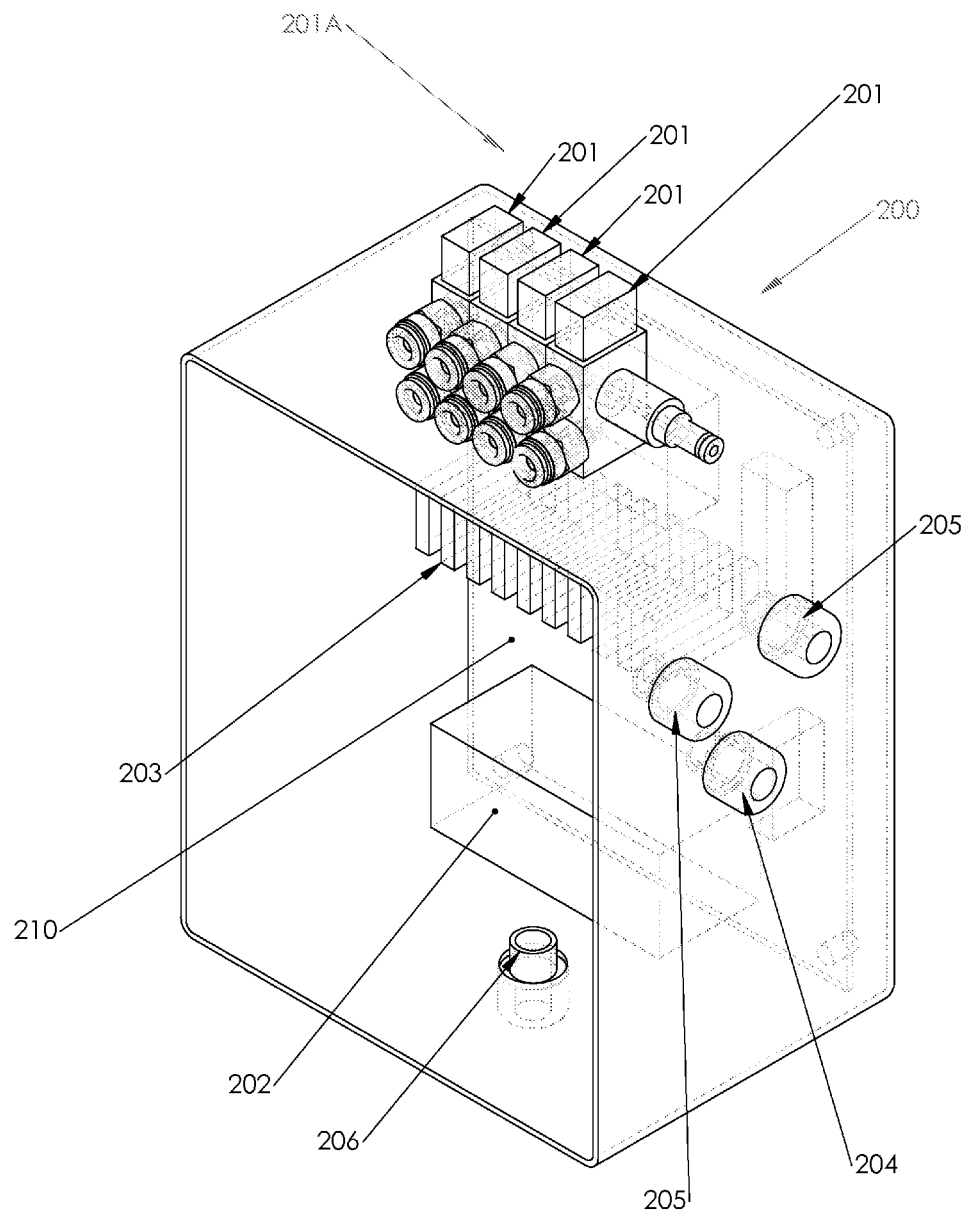
Figure 6:
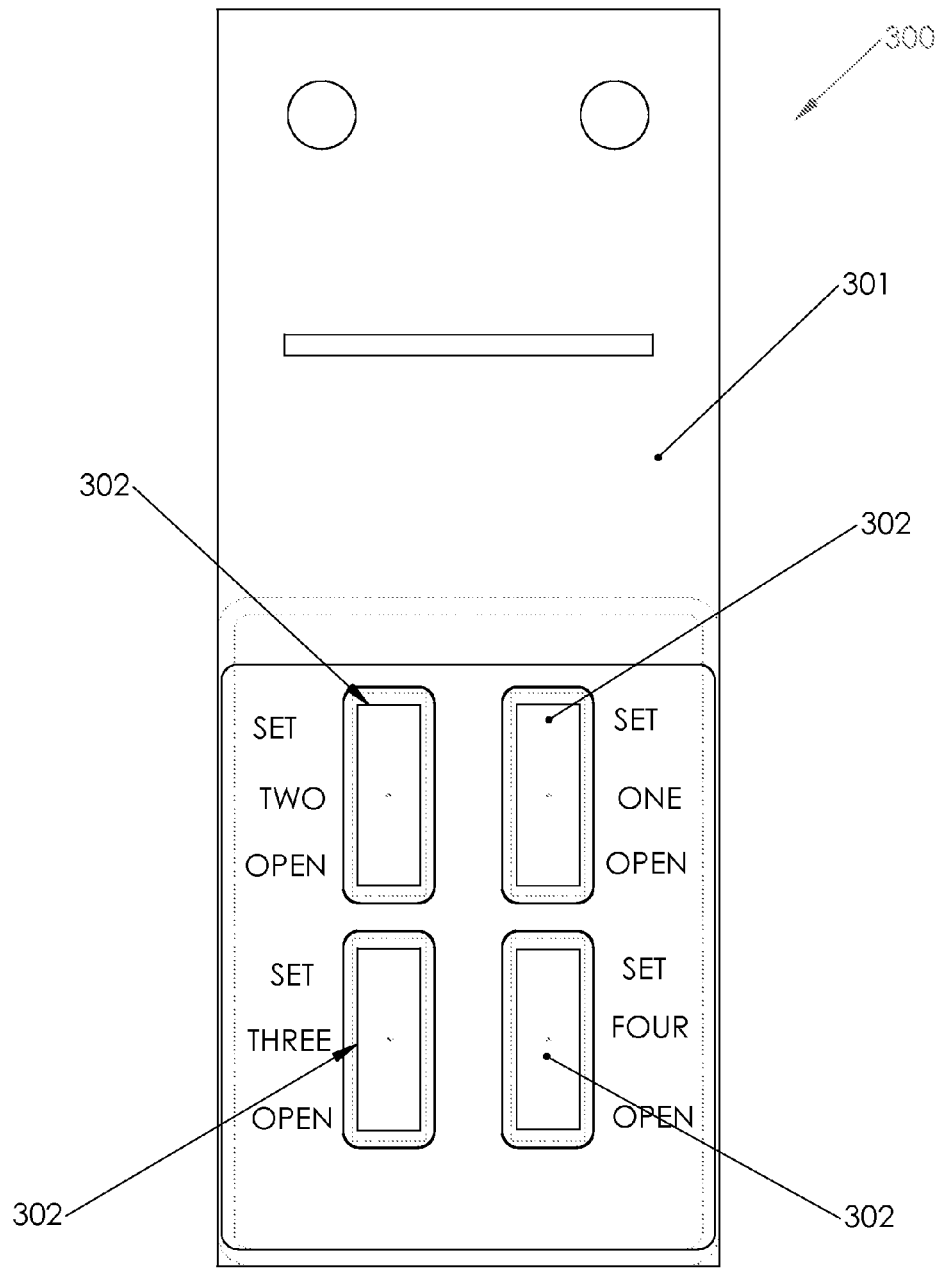

The operator control panel 300 shown in FIG. 6 comprises multiple three position toggle switches 302 for each valve shown on FIG. 5 item 201, each position of the toggle switch performs a function either directly controlling a valve 201 or providing an input signal to the programmable logic controller 210 shown in FIG. 5 item 203. When the toggle switch 302 is in the middle position the valve 201 is not powered and the clamp 120 is driven to the clamping position. When the toggle switch 302 is moved into the "SET" position, the toggle switch provides a voltage signal to the programmable logic controller 210. The programmable logic controller uses this signal to save the position of the table via the position sensing device. The programmable logic controller is programmed (see program listing ***) to provide a digital output to the corresponding valve when the table is inside the programmed area. Note the "SET" position of the toggle switch 302 is a momentary position (when released it moves back to the middle position) this action turns the signal to the programmable logic control off. When the table moves out of the "clamp retract" area 600 programmed into the programmable logic controller the programmable controller turns the digital output to the valve off, causing the clamp 120 to extend back into the clamping position.

The fact that the toggle switch (item 302 of FIG. 6) has three positions is immaterial, since the control panel could perform the same function using three switches to control the valve and the signal to the programmable logic controller. This implementation simply serves as an easy method of illustrating the use of the controller.

Figure 7:
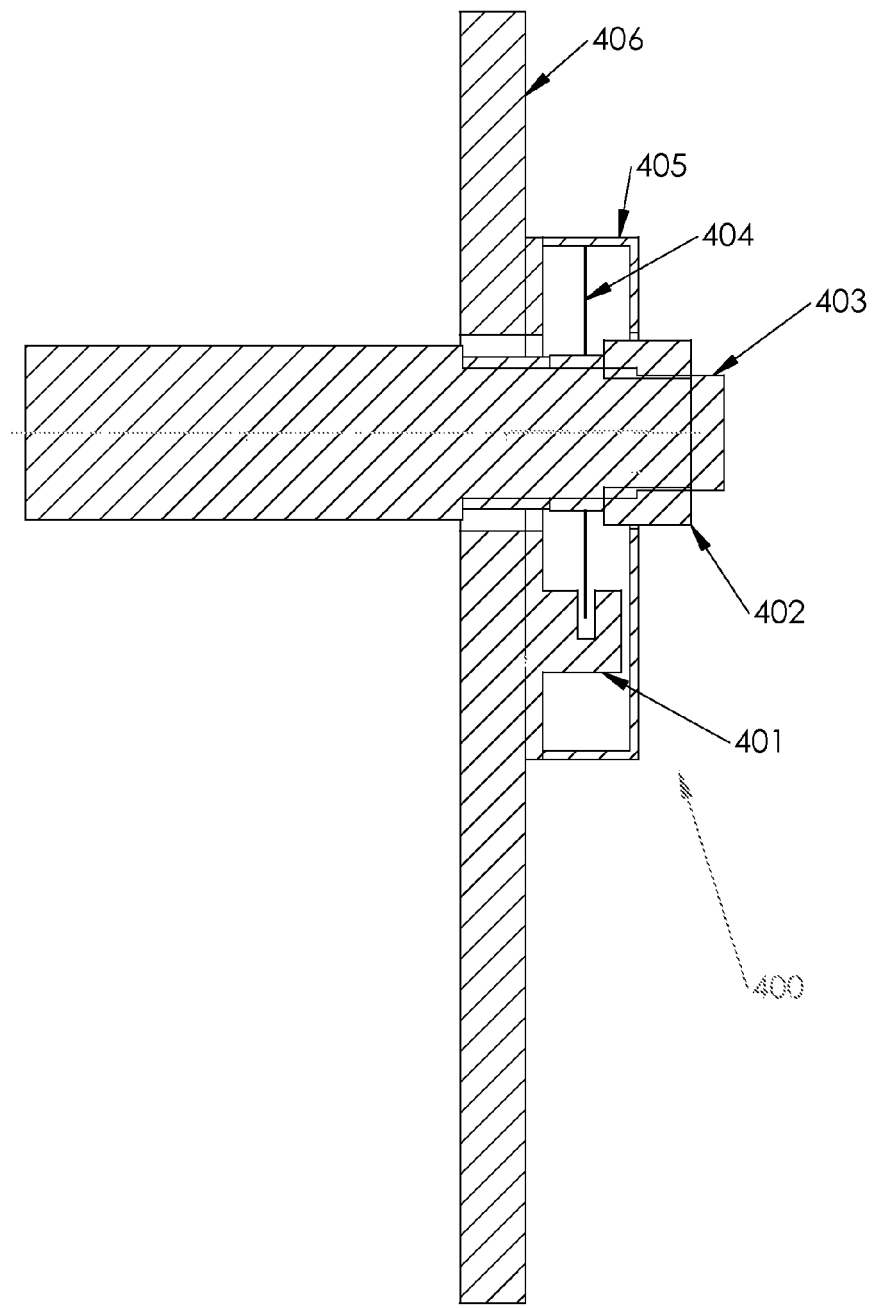

In this implementation the encoders are attached directly to the lead screws of the milling machine as shown in view FIG. 1 item 400. The encoders (FIG. 7 item 400) used in this implementation are a purchased item (US Digital P/N E6D) and are designed by the manufacturer to be mounted to the rotating shaft and the surrounding structure. FIG. 7 shows a cross section of a typical encoder mounting. In FIG. 7 each of the parts making up the encoder assembly are shown. They include the sensor head item 401, the encoder dial item 404, the encoder cover item 405, and the shaft clamp item 402. Additionally, a milling machine lead screw item 403 and the encoder mount item 406 are also shown.

The encoder functions in the traditional way for such a device i.e. as the lead screw 403 turns the encoder dial 404 also turns. The encoder dial 404 is made of transparent plastic or glass but has marking on it. The sensor head 401 comprises a light source and a light sensor (not shown), as the encoder dial turns the sensor head responds to each marking causing a pulse to the programmable logic controller.

The above description mentions the movement of the clamp with the controller monitoring the position of the table and thus the clamp position. This is typical of milling machines which move the table which holds the work piece. So the clamp (fixed to the table) moves with the table, the cutting tool rotates on a stationary spindle.

In the case of a router (typically used for plastics or wood) the table is stationary and the cutting tool spindle is moved. In this case, the control system would function in essentially the same manner however it would monitor the position of the spindle instead of the table.

In the above descriptions the use of milling machine examples has been used. This device could easily be adapted for use on a device which uses other methods of manipulating the work piece. For instance laser cutting or engraving, water jet cutting or engraving, chemical etching, electrical discharge machining (a.k.a. EDM) or any other method of manipulation requiring access to the work piece surface.

To assist and help understand the claims of the clamping mechanism the following definitions are to be used. Also, in FIG. 4 the distance between the two base holes is labeled 101, this dimension is used to identify the relative lengths of the structural parts defined below.

Figure 4:
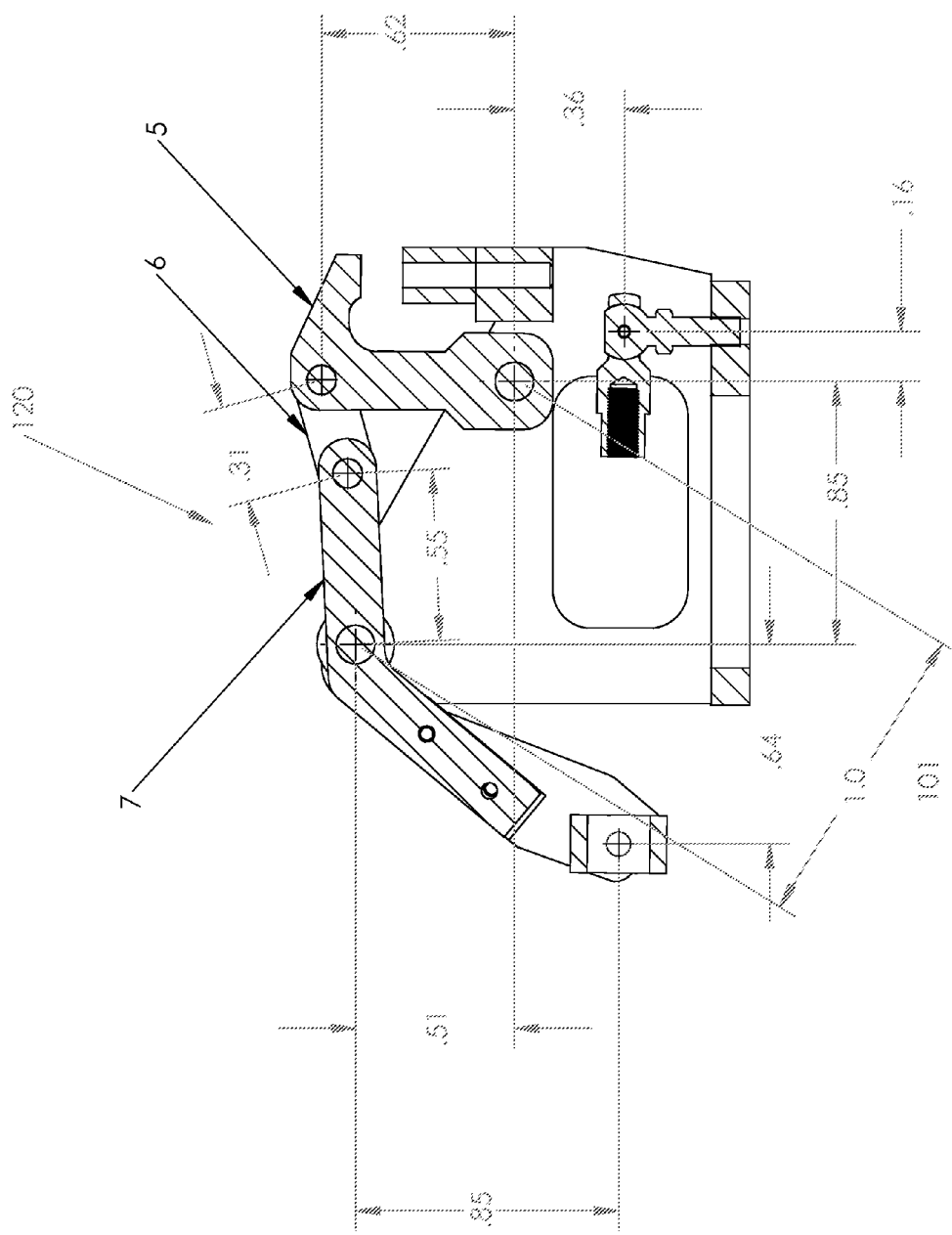
FIG. 4—A cross sectional view of the clamp mechanism showing the relative lengths of each linkages FIG. 5—An isometric view of the controller, illustrating the programmable logic controller, power supply and valves FIG. 6—A plan view of the interface panel FIG. 7—A cross sectional view of an installed encoder assembly FIG. 8—A plan view of a single clamp showing a typical retract area around a clamp FIG. 9—An isometric of a single clamp—Suggested Drawing Figure

Linkone is defined as a structural piece as shown in FIG. 4 part 5. Additionally this part will have the additional restriction of having the two holes being approximately 0.62 distance apart relative to the distance of the two base holes. As an example given that the base holes are 30 mm apart then the distance of the spacing of the two holes in linkone is to be 30×(0.62) mm or 18.66 mm. Also linkone will include a foot surface as shown in FIG. 4.

Linktwo is defined as a structural piece as shown in FIG. 4 part 6. Additionally this part will have the additional restriction of having the two holes being approximately 0.31 distance apart relative to the distance of the two base holes. As an example given that the base holes are 30 mm apart then the distance of the spacing of the two holes in linktwo is to be 30×(0.31) mm or 9.4 mm. However, linktwo for the purposes of this discussion will include an implementation of two identical pieces or a single piece, the two pieces are used in an implementation only to provide for stability and ease of manufacturing.

Linkthree is defined as a structural piece as shown in FIG. 4 part 7. Additionally this part will have the additional restriction of having the three holes being approximately 0.55 and 0.64×0.85 distances from the center hole relative to the distance of the two base holes. As an example given that the base holes are 30 mm apart then the distance of the spacing of the first hole in linkthree is to be 30×0.55 mm or 16.6 mm.

Cablejacketpivot is defined as a structural piece as shown in FIG. 3 item 14. This part comprises a tapped hole for mounting a push/pull cable jacket and two side pivots as shown.

Base is defined as a structural piece as shown in FIG. 3 item 24. Additionally, the pivot holes and placement of a hole for the spherical pivot are located on the part assuming positions based on the spacing of the base holes. For instance the horizontal position of the mounting hole for the spherical pivot refer FIG. 4 feature 8 is 0.16×30 mm (using the example of the definition of linkone).

The pivotpin is defined as a pin of sufficient length and diameter as to provide for the support of and connection between two parts. Said pivotpin diameter is to be additionally constrained to allow relative rotation of said two connected parts.

Retractarea is a rectangular area (as shown in FIG. 8 feature 600) which surrounds the clamp linkage linkone. The program used in the programmable logic controller of the controller causes the clamp to retract from the work piece as the cutting tool is inside this area. This area is established when the corresponding toggle switch is pressed into the "Set" position. A complete program listing is provided in appendix A.

I claim:

1. A clamping system for holding a work piece during machining processes wherein all edges of the work piece are able to be machined using a cutting tool without stopping the process to move or reposition said work piece comprising:

A: a plurality of clamps capable of retracting to clear said cutting tool each plurality of clamps comprising;
- a base having two pivot hole locations and a spherical pivot;
- a linkone attached to base at pivot hole one with a pivotpin;
- a linktwo attached to said linkone with a pivotpin;
- a linkthree attached at hole one to said linktwo with a pivotpin using the remaining linktwo hole;
- linkthree attached at the middle hole to second base pivot hole with a pivotpin;
- a cablejacketpivot attached to the remaining hole of linkthree;
- a push/pull cable assembly with cable jacket attached to said cablejacketpivot and internal cable attached to said spherical pivot;
- a means of actuating said internal cable relative to said jacket for actuating said clamp;

B: a means of tracking the work piece location;
C: a plurality of valves;
D: a controller programmed to actuate each valve in response to the work piece position;
E: an operator interface for manually actuating the valves; and
F: said operator interface for indicating a location for retracting each said clamp.

2. The clamping system of claim 1 wherein the means of actuating said internal cable relative to said jacket comprises:
- an air cylinder; and
- an air cylinder mount attached to the end of said push/pull cable assembly cable jacket and the end of the internal cable attached to the rod of said air cylinder.

3. The clamping system of claim 2 wherein the means of tracking the work piece location comprises an encoder attached to a plurality of ball screws used to position the work piece.

4. The clamping system of claim 3 wherein the controller receives electrical pulses from each encoder and determines the position of the work piece.

5. The clamping system of claim 4 wherein each said valve is connected pneumatically to an inlet of pressurized air and dual outlets for actuating each said clamp.

6. The clamping system of claim 5 wherein the operator interface for manually actuating the valves comprises:
   A: an enclosure;
   B: a front panel;
   C: a plurality of switches for sending electrical signals to said controller;
   D: a plurality of buttons located on said front panel for actuating said plurality of switches for sending electrical signals to said controller; and
   E: a graphical label affixed to the front panel indicating the function of each said buttons for actuating said plurality of switches for sending electrical signals to said controller.

7. The clamping system of claim 6 wherein the said programmed controller receives electrical signals from said operator interface and determines a range of work piece locations that will cause said programmed controller to retract said corresponding clamp.

8. A method of using the clamping system of claim 7 for indicating a work piece location to a programmed controller to retract a clamp comprising;
   A: positioning a work piece in the position for clamp retraction;
   B: pressing the button corresponding to the said clamp;
   C: allowing the programmed controller to store and calculate an area for retraction of said clamp; and
   D: allowing the programmed controller to monitor the work piece position and retract said clamp while the work piece is in said calculated area.

9. A method of using the clamping system of claim 7 for machining a work piece edges comprising;
   A: clamping a work piece in the clamping system of claim 1;
   B: positioning said work piece in plurality of areas of said clamps;
   C: pressing said button corresponding to each said clamp;
   D: allowing the programmed controller to store and calculate an area for retraction of said clamp; and
   E: allowing said programmed controller to retract each said clamp as said work piece is positioned into each said area for retraction.

* * * * *